No. 676,387. Patented June 11, 1901.
F. KÜSTNER.
TURFING ATTACHMENT FOR SEWING MACHINES.
(Application filed Nov. 22, 1900.)
(No Model.) 3 Sheets—Sheet 2.
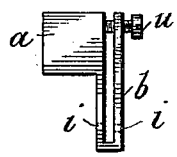
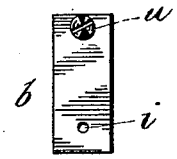
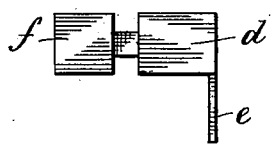
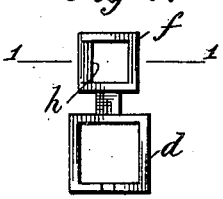
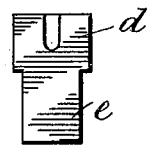
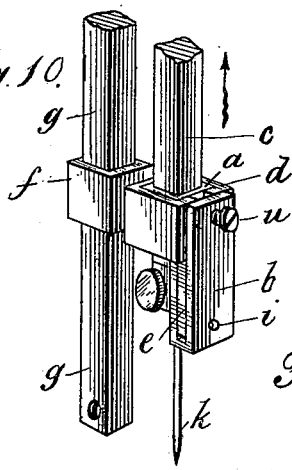
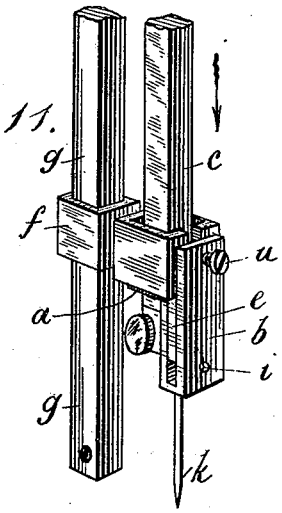
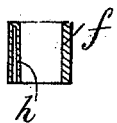
Witnesses:
Inventor
Franz Küstner
By James L. Norris
Atty No. 676,387. Patented June 11, 1901.
F. KÜSTNER.
TURFING ATTACHMENT FOR SEWING MACHINES.
(Application filed Nov. 22, 1900.)

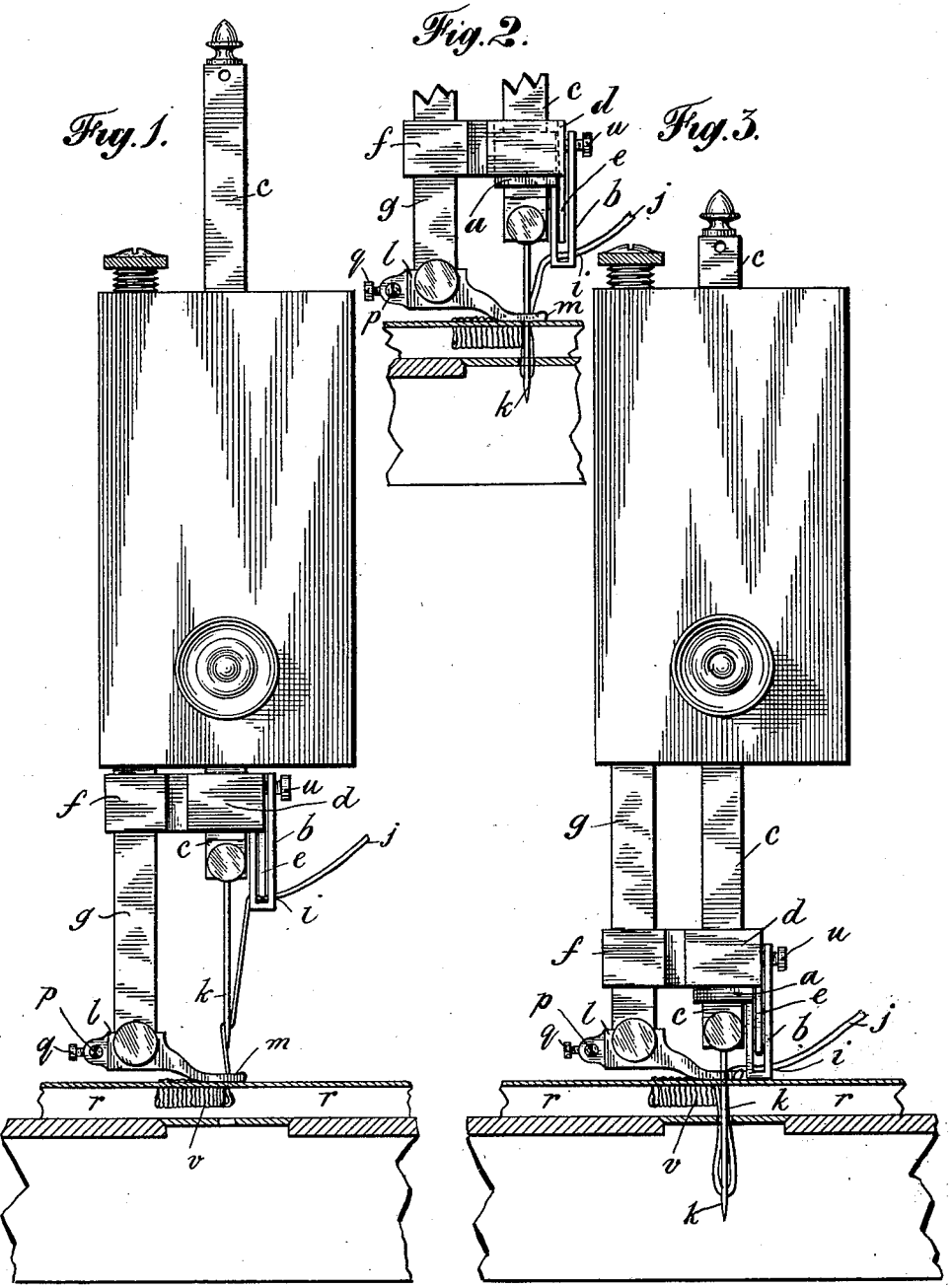

(No Model.) 3 Sheets—Sheet 3.

Witnesses
Inventor
Franz Küstner
By James L. Norris
Atty.

UNITED STATES PATENT OFFICE.

FRANZ KÜSTNER, OF LONDON, ENGLAND, ASSIGNOR OF ONE-HALF TO HERMANN LOOG, OF SAME PLACE.

TURFING ATTACHMENT FOR SEWING-MACHINES.

SPECIFICATION forming part of Letters Patent No. 676,387, dated June 11, 1901.

Application filed November 22, 1900. Serial No. 37,363. (No model.)

*To all whom it may concern:*

Be it known that I, FRANZ KÜSTNER, a subject of the Emperor of Austria-Hungary, residing at 27 Acre Lane, Brixton, London, England, have invented certain new and useful Improvements in Turfing Attachments for Sewing-Machines, of which the following is a specification.

The object of this invention is to construct a turfing attachment for sewing-machines whereby embroidery, pile, and the like can be produced in any desired pattern and to any desired closeness, the appliances being easily attachable to an ordinary sewing-machine.

The invention will be understood from the following description, aided by the accompanying drawings, in which—

Figure 12:
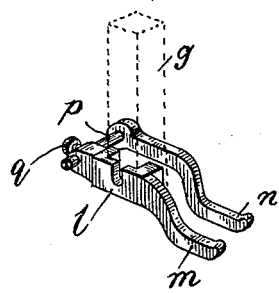
Figure 13:
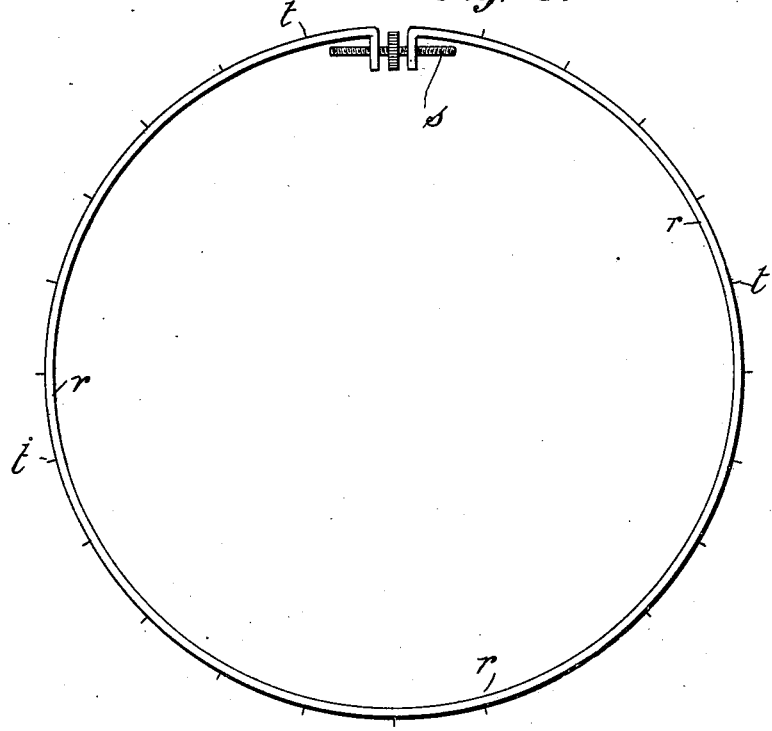
Figure 14:
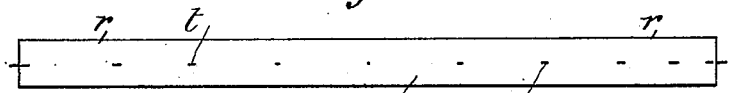

Figure 1 is an elevation of the head of a sewing-machine with the appliances attached, the position being that of the commencement of the downstroke. Fig. 2 is an elevation of part of the presser-foot, needle-bar, and work-plate, the appliances being attached and in the position they occupy when nearing the bottom of the downstroke. Fig. 3 is an elevation of the head of a sewing-machine with the appliances in the position they occupy when the needle-bar is at the bottom of the stroke. Figs. 4, 5, and 6 are side, plan, and face views of one of the appliances and consisting of a sleeve having a depending loop. Figs. 7, 8, and 9 are side, plan, and face views of the other appliance and consisting of a double sleeve, one carrying a depending plate, Fig. 8$^a$ being a section on line 1 1 of Fig. 9. Figs. 10 and 11 are perspective elevations of portions of the needle-bar and presser-foot bar with the appliances attached, Fig. 10 showing the appliances in the position they occupy for the greater portion of the upstroke and Fig. 11 that for the greater portion of the downstroke. Fig. 12 is a perspective elevation of the presser-foot it is preferred to employ. Figs. 13 and 14 are plan and edge views of the tambour-frame it is preferred to employ.

For the purpose of this invention a kind of sleeve $a$ having a depending loop $b$ is screwed or otherwise applied to the needle-bar $c$ of a sewing-machine, and this sleeve $a$ is encircled by another sleeve $d$, having a depending plate $e$ for action in the loop $b$ of the previously-mentioned or fixed sleeve $a$. The second-mentioned or loose sleeve $d$ is in connection with a sliding sleeve $f$, which encircles the presser-bar $g$ and has a motion up and down same, the necessary grip for retaining it in position at the ends of the up- and-down movements being obtained by a spring $h$, bearing against the presser-bar, or other device in connection therewith.

The loop $b$ of the fixed sleeve $a$ is provided with two holes $i$ for the wool or thread $j$ to pass through on its way to the needle $k$.

The presser-foot $l$ is made adjustable as to height, and its toes $m$ $n$ are made wider than usual, one toe $n$ having a movement sidewise and carrying a pin $p$ for being held in position by a screw $q$, this also clamping the presser-foot to the presser-bar $g$.

In connection with the above I employ a tambour-frame, Figs. 13 and 14, on which the material to be worked is stretched, and the frame I prefer to employ is constructed as a band $r$, connected at its ends by a right and left hand screw and provided around its outer periphery with pins $t$, onto which the material to be worked is passed, and action on the screw will expand the band, and thus stretch the material. When the appliances are fitted, the bobbin or reel under the work-plate is not required, and it is preferable to remove same from its traveler.

The wool, silk, or other material is run from the reel or bobbin through the two holes $i$ in the loop $b$ and then threaded through the needle, and when the needle is at the top of its stroke, Fig. 1, the wool $j$ is in a locked position, as hereinafter described, and the combined sleeves $d f$ are situated at the lower part of the fixed sleeve $a$, and when the needle-bar is depressed said sleeve $a$ will slide in the movable sleeve $d$ (this being retained in position by the spring $h$ or other device on the sliding sleeve $f$) until the screw or pin $u$ of the fixed sleeve $a$ comes in contact with the upper edge of the movable sleeve $d$, (the wool being by this movement freed,) when the further motion will carry the combined sleeves $f d$ downward, the wool $j$ at the same time being drawn from the reel or bobbin through the work. The needle $k$ has now reached the bottom of its stroke, Fig. 3, and on the return motion the fixed sleeve $a$ will again slide about the movable sleeve $d$ until the depending piece $e$ of the fixed sleeve $a$ comes in contact with the bottom of the loop $b$ of the fixed sleeve $a$, to carry the combined sleeves $d\,f$ and lock the wool. During this portion of the motion the needle has been leaving the material and the wool is free; but so soon as the depending piece $e$ reaches the wool $j$, which has been passed through the two holes $i$ just above the base, the wool $j$ will be jammed by the weight of the combined sleeves $d\,f$ and become locked, which, so to speak, acts as the take-up during the upward motion of the needle $k$, a portion of the wool being left in loop form on the under side of the fabric, the wool being locked until just about the first movement of the return stroke for making the next stitch.

The material (or a portion of same) to be worked is stretched on the frame $r$, Fig. 13, before described, and being passed under the presser-foot $l$ can be manipulated for stitching to any desired design and in any desired manner, the stitching-lines crossing and recrossing each other, according to the manipulation and closeness of the pile or embroidery required; the loops on the under side of the material, which in wear would be the face, forming a kind of pile of great substance and of pretty effect for many articles of wearing-apparel and ornament.

The depths of the loops $v$, forming the pile, are determined by the length of the depending loop $b$ of the fixed carrier and the plate $e$ of movable sleeve $d$.

The drawings show the presser-foot bar and the needle-bar as being of square formation; but such may be round or of other shape, as desired.

What I claim, and desire to secure by Letters Patent, is—

1. A turfing attachment for sewing-machines consisting of a sleeve $a$ having a depending holed loop $b$ affixed to the presser-foot bar $c$; combined sleeves $f\,d$, sleeve $f$ encircling the presser-foot bar $g$, the sleeve $d$ encircling the sleeve $a$ and having a depending plate $e$ having action with the loop $b$; and means for normally maintaining said combined sleeves in a fixed position, substantially as set forth.

2. A turfing attachment for sewing-machines consisting of a sleeve $a$ having a depending loop $b$ and fixed to the needle-bar $c$; combined sleeves $d\,f$, $d$ encircling sleeve $a$ and the other $f$ encircling presser-foot bar $g$; pin or screw $u$ for fixing the sleeve $a$ to the needle-bar $c$ and limiting the movement of the sleeve $d$; spring $h$ or its equivalent to sleeve $f$ for retaining such sleeve in position when not being moved by sleeve $a$, all substantially as set forth.

In testimony whereof I have hereunto set my hand in presence of two subscribing witnesses.

FRANZ KÜSTNER.

Witnesses:
WM. O. BROWN,
F. C. SMITH.